(12) United States Patent
Brown et al.

(10) Patent No.: US 9,805,121 B2
(45) Date of Patent: Oct. 31, 2017

(54) MANAGEMENT OF DIFFERENT DATABASE SYSTEMS AND/OR ENVIRONMENTS

(71) Applicant: TERADATA US, INC., Dayton, OH (US)

(72) Inventors: Douglas P. Brown, Rancho Santa Fe, CA (US); Michael G. Coutts, San Diego, CA (US); Sergio Ferragut, Temecula, CA (US)

(73) Assignee: Teradata US, Inc., Dayton, OH (US)

( * ) Notice: Subject to any disclaimer, the term of this patent is extended or adjusted under 35 U.S.C. 154(b) by 504 days.

(21) Appl. No.: 14/183,029

(22) Filed: Feb. 18, 2014

(65) Prior Publication Data
US 2014/0280333 A1   Sep. 18, 2014

Related U.S. Application Data

(60) Provisional application No. 61/789,374, filed on Mar. 15, 2013.

(51) Int. Cl.
*G06F 17/00* (2006.01)
*G06F 17/30* (2006.01)

(52) U.S. Cl.
CPC ............... *G06F 17/30864* (2013.01)

(58) Field of Classification Search
CPC ............ G06F 3/04842; G06F 9/45558; G06F 17/30598; G06F 2009/4557; G06F 3/0484
See application file for complete search history.

(56) References Cited

U.S. PATENT DOCUMENTS

2004/0064449 A1* 4/2004 Ripley ............. G06F 17/30477
2008/0228947 A1* 9/2008 Markus ............. G06F 17/30864
                                                                    709/217

* cited by examiner

*Primary Examiner* — Truong Vo
(74) *Attorney, Agent, or Firm* — Ramin Mahboubian (57) ABSTRACT

A database request can be processed at least partly based on one or more differences between multiple database systems and/or environments. The differences can, for example, include differences between one or more database capabilities respectively provided by the multiple database systems, differences between the representation of data in the multiple database systems, and differences in the interfaces for accessing the multiple database systems.

21 Claims, 4 Drawing Sheets

MANAGEMENT OF DIFFERENT DATABASE SYSTEMS AND/OR ENVIRONMENTS

CROSS-REFERENCE TO THE RELATED APPLICATIONS

This application takes priority from the Provisional U.S. Patent Application No. 61/789,374, entitled: "Multi-System Query and Process Management," by Douglas P. Brown, filed on Mar. 15, 2013, which is hereby incorporated by reference herein in its entirety and for all purposes.

BACKGROUND

Data can be an abstract term. In the context of computing environments and systems, data can generally encompass all forms of information storable in a computer readable medium (e.g., memory, hard disk). Data, and in particular, one or more instances of data can also be referred to as data object(s). As is generally known in the art, a data object can, for example, be an actual instance of data, a class, a type, or a particular form of data, and so on.

Generally, one important aspect of computing and computing systems is storage of data. Today, there is an ever increasing need to manage storage of data in computing environments. Databases provide a very good example of a computing environment or system where the storage of data can be crucial. As such, to provide an example, databases are discussed below in greater detail.

The term database can also refer to a collection of data and/or data structures typically stored in a digital form. Data can be stored in a database for various reasons and to serve various entities or "users." Generally, data stored in the database can be used by one or more "database users." A user of a database can, for example, be a person, a database administrator, a computer application designed to interact with a database, etc. A very simple database or database system can, for example, be provided on a Personal Computer (PC) by storing data (e.g., contact information) on a Hard Disk and executing a computer program that allows access to the data. The executable computer program can be referred to as a database program, or a database management program. The executable computer program can, for example, retrieve and display data (e.g., a list of names with their phone numbers) based on a request submitted by a person (e.g., show me the phone numbers of all my friends in Ohio).

Generally, database systems are much more complex than the example noted above. In addition, databases have been evolved over the years and are used in various business and organizations (e.g., banks, retail stores, governmental agencies, universities). Today, databases can be very complex. Some databases can support several users simultaneously and allow them to make very complex queries (e.g., give me the names of all customers under the age of thirty five (35) in Ohio that have bought all the items in a given list of items in the past month and also have bought a ticket for a baseball game and purchased a baseball hat in the past 10 years).

Typically, a Database Manager (DBM) or a Database Management System (DBMS) is provided for relatively large and/or complex databases. As known in the art, a DBMS can effectively manage the database or data stored in a database, and serve as an interface for the users of the database. For example, a DBMS can be provided as an executable computer program (or software) product as is also known in the art.

It should also be noted that a database can be organized in accordance with a Data Model. Some notable Data Models include a Relational Model, an Entity-relationship model, and an Object Model. The design and maintenance of a complex database can require highly specialized knowledge and skills by database application programmers, DBMS developers/programmers, database administrators (DBAs), etc. To assist in design and maintenance of a complex database, various tools can be provided, either as part of the DBMS or as free-standing (stand-alone) software products. These tools can include specialized Database languages (e.g., Data Description Languages, Data Manipulation Languages, Query Languages). Database languages can be specific to one data model or to one DBMS type. One widely supported language is Structured Query Language (SQL) developed, by in large, for Relational Model and can combine the roles of Data Description Language, Data Manipulation Language, and a Query Language.

Today, databases have become prevalent in virtually all aspects of business and personal life. Moreover, usage of various forms of databases is likely to continue to grow even more rapidly and widely across all aspects of commerce, social and personal activities. Generally, databases and DBMS that manage them can be very large and extremely complex partly in order to support an ever increasing need to store data and analyze data. Typically, larger databases are used by larger organizations, larger user communities, or device populations. Larger databases can be supported by relatively larger capacities, including computing capacity (e.g., processor and memory) to allow them to perform many tasks and/or complex tasks effectively at the same time (or in parallel). On the other hand, smaller databases systems are also available today and can be used by smaller organizations. In contrast to larger databases, smaller databases can operate with less capacity.

A current popular type of database is the relational database with a Relational Database Management System (RDBMS), which can include relational tables (also referred to as relations) made up of rows and columns (also referred to as tuples and attributes). In a relational database, each row represents an occurrence of an entity defined by a table, with an entity, for example, being a person, place, thing, or another object about which the table includes information.

One important objective of databases, and in particular a DBMS, is to optimize the performance of queries for access and manipulation of data stored in the database. Given a target environment, an "optimal" query plan can be selected as the best option by a database optimizer (or optimizer). Ideally, an optimal query plan is a plan with the lowest cost (e.g., lowest response time, lowest CPU and/or I/O processing cost, lowest network processing cost). The response time can be the amount of time it takes to complete the execution of a database operation, including a database request (e.g., a database query) in a given system. In this context, a "workload" can be a set of requests, which may include queries or utilities, such as, data loader that have some common characteristics, such as, for example, application, source of request, type of query, priority, response time goals, etc.

As a prominent example of database systems, Traditional Enterprise Data Warehousing has been focused on having a single large environment that can maintain all of the data required ("One Version of the Truth") in tandem with sufficient processing and I/O capability to satisfy a myriad of different workloads. However, the Business Requirements that an EDW typically needs to satisfy have evolved in at least two distinct ways, namely High Availability and Alternate Data Processing.

High Availability is traditionally satisfied by having a second, ideally equivalent, environment that can be made available in case of a failure of the first system (Active-Standby) or which can operate in tandem with the first system (Active-Active). Both approaches require Data Synchronization while the latter approach can actually help with responsiveness through allowing for more processing capability when both systems are available as requests (queries) can be directed or load balanced across systems.

Alternate Data Processing can generally refer to the ability to issue a request (query) against data that does not necessarily conform to the Relational Model employed by databases. Such data could, for example, be semi-structured (Key, Value pairs), pure text, encoded sensor data etc. and the processing operations conducted against it might be relational, procedural, functional, mapper or reducer based (Map Reduce is a technique that can be applied to this type of alternate data to essentially turn it into a result set form by mapping input data against some pre-determined structure and reducing the resulting output to a final set by applying a selection algorithm). Two examples of these Alternate Data Processing (ADP) environments are Aster Data and Hadoop based environment as generally known in the art, where Aster Data can combine a parallel database approach as a means to store the data with a SQL wrapped Map Reduce capability (SQL-MR) provide for ADP, and Hadoop can combine a distributed file system with a Map Reduce framework to provide for ADP.

In the context of these differing database environments, a given piece of Information might exist in different data formats. For example, the full web click trail associated with a web based purchase might be stored as file data within a Hadoop system that could indicate the username (User ID) of the purchaser and the product purchasing details (Product ID and Purchase Price). A Map-Reduce function could be applied to that data in order to find all Products purchased by a given user and their purchase price. The full web click trail or just the final web transaction log could be stored within an Aster Data record again providing access to the User ID, Product ID and Purchase Price through a SQL-MR operation. An EDW, such as Teradata, could hold the web purchases in a relational "Sales" table which can be queried through SQL (select ProductID, SalesPrice from Sales where UserId=?).

In view of the foregoing, database systems and environments, including, Traditional Enterprise Data Warehousing and Alternate Data Processing (ADP) are highly useful.

SUMMARY

Broadly speaking, the invention relates to computing environments and systems. More particularly, the invention relates to management of different database systems and/or environments.

In accordance with one aspect of the invention, a database request can be processed at least partly based on one or more differences between multiple database systems and/or environments. The differences can, for example, include differences between one or more database capabilities respectively provided by the multiple database systems, differences between the representation of data in the multiple database systems, and differences in the interfaces for accessing the multiple database systems.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

As noted in the background section, database systems and environments, including those utilizing Traditional Enterprise Data Warehousing and Alternate Data Processing (ADP) are highly useful.

Moreover, there is a need to utilize various forms of database systems environments, including those that utilize Traditional Enterprise Data Warehousing and Alternate Data Processing (ADP), in a cohesive manner.

Accordingly, improved techniques for management of multiple database systems and/or environments are disclosed.

More specifically, a database request can be processed at least partly based on (or by considering) one or more differences between multiple database systems and/or environments in accordance with one aspect of the invention. The differences can, for example, include differences between one or more database capabilities respectively provided by the multiple database systems, differences between the representation of data in the multiple database systems, and differences in the interfaces for accessing the multiple database systems.

Embodiments of these aspects of the invention are also discussed below with reference to FIGS. 1-4. However, those skilled in the art will readily appreciate that the detailed description given herein with respect to these figures is for explanatory purposes as the invention extends beyond these limited embodiments.

Figure 1:
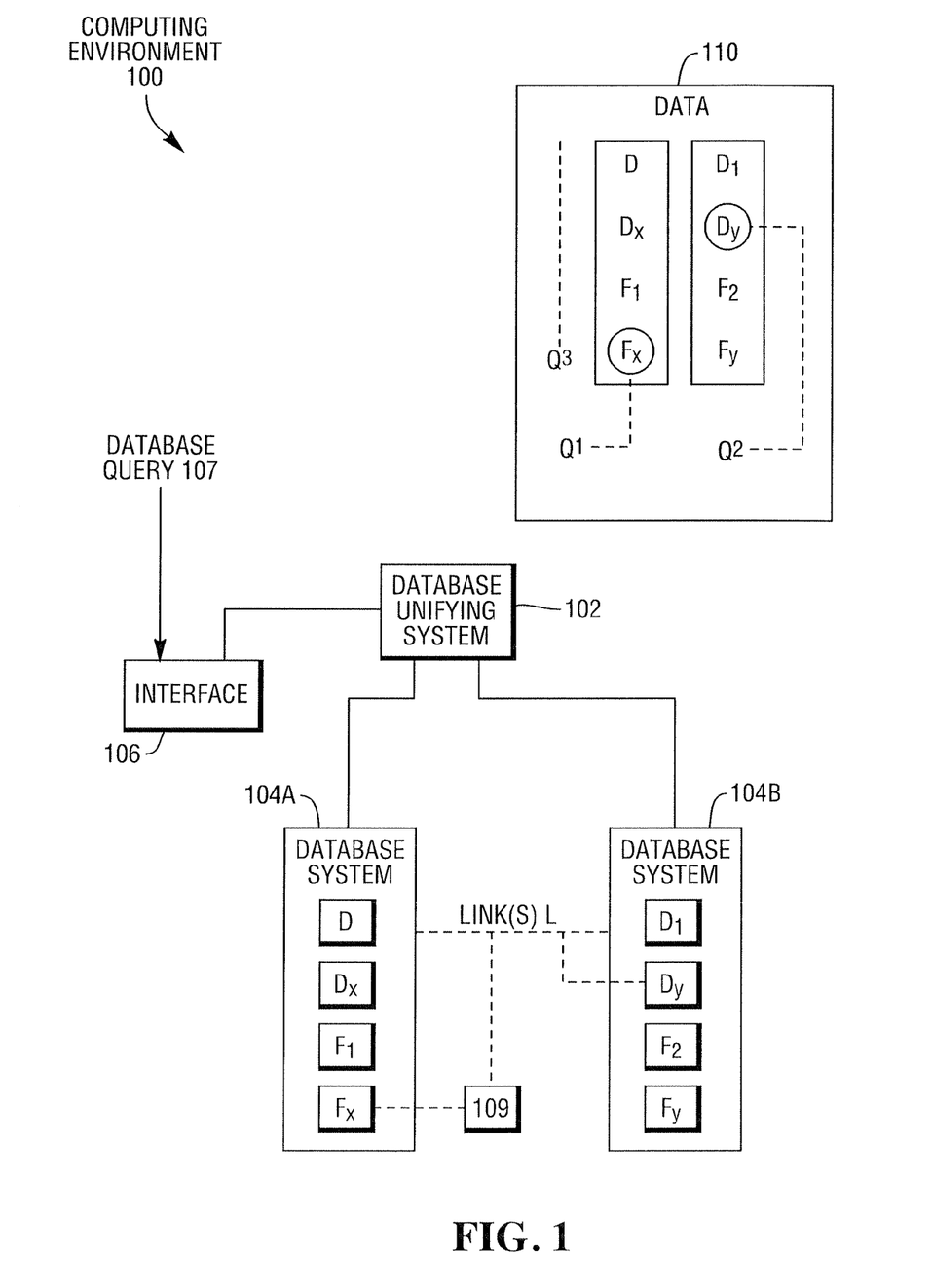
FIG. 1 depicts a computing environment with a database unifying system (or unifying system) capable of supporting multiple database systems in accordance with one embodiment of the invention.

FIG. 1 depicts a computing environment 100 with a database unifying system (or unifying system) 102 capable of supporting multiple database systems 104A and 104B in accordance with one embodiment of the invention. Referring to FIG. 1, it will be appreciated that the database unifying system 102 can effectively serve to unify different database systems, namely database systems 104A and 104B, despite their differences. In other words, the database unifying system 102 can unify heterogeneous database systems with different database types, for example, with respect to their data representation, database functions and/or interfaces, as well as homogeneous database systems that can essentially be of the same type. By way of example, the database unifying system 102 can unify a traditional relational database system with a non-traditional and/or non-relational database system (e.g., a Hadoop based database system). As such, the database unifying system 102 can effectively function as a global or universal (or unifying) database that can interact with various database systems despite their differences, for example, as a virtual database driving interaction with various database systems despite their differences.

The differences between the database systems 104A and 10B can, for example, include the differences between their database functions, interfaces, data representations. Referring to FIG. 1, the differences in data representation between the database systems 104A and 104B are exemplified as data D represented in database system 104A (e.g., a table in a relational database) and $D_1$ (e.g., data provided as a file and/or video file in a non-relational database). In addition to the differences in data representation, it should be noted that distinct, specific, or particular data (or data sets) may also exist only in one database system as represented by the distinct data sets $D_x$ and $D_y$, respectively for database systems 104A and 104B.

The differences between database capabilities are also exemplified in FIG. 1, namely, by depicting different functions $F_1$ and $F_2$, respectively for database systems 104A and 104B, where they can, for example, represent database functions provided in a different manner and/or different versions of a database function, etc. In the context of database capabilities, also, a distinct, specific, or particular function $F_x$ may only be supported by one database system, namely, the database system 104A, while possibly another distinct or particular function $F_y$ may only be supported by the database system 104B, as exemplified in FIG. 1. FIG. 1 also exemplifies differences in interfaces for accessing the database systems 104A and 104B by depicting an interface 106 for accessing the database system 104A where it cannot be directly used to access the other database system, namely database system 104B.

It will be appreciated that in order to address the differences between the database systems 104A and 104B, the unifying system 102 can use one or more links (L) for effectively connecting or linking the database system 104A and 104B together despite their differences. Those skilled in the art will appreciate that a link (L) can, for example, be provided as an external view form one database system to another database system, as will also be discussed below. By way of example, a link (L) would allow data sets $D_y$ (which is only available in database system 104B) to be accessed from the database 104A. This, among other things, allows a database query 107 that cannot be executed by database system 104B to be executed by the database system 104A by using data sets $D_y$ which is only available in database system 104B. In this context, data sets $D_y$ can effectively be provided by a link (L) between the database systems 104A and 104B.

As another example, a link (L) could effectively allow providing the database system 104B the result of execution (result data or result data set) 109 of a distinct function $F_x$ only available in database system 104A, and so on.

It should be noted that the database unifying system 102 can also effectively coordinate the execution of a database request by the database systems 104A and 104B. In other words, the database unifying system 102 can process database requests by effectively understanding the database systems 104A and 104B and considering the differences between them (e.g., by understanding capabilities, interfaces and/or data representations associated with the database systems and their respective differences). Hence, the database unifying system 102 can process a database request by at least one of the database systems 104A and 104B and in consideration of one or more differences between them. These difference can, for example, include: one or more database capabilities provided by the database systems 104A and 104B, differences between the representation of data in the database systems 104A and 104B, and differences in the interfaces for accessing the database systems 104 and 104B.

As suggested above, the differences that can be considered between the one or more database capabilities provided by the multiple database systems 104A and 104B can, for example, include: (i) at least one database function provided by a first one of the multiple database systems but not provided by a second one of the multiple database systems to the extent it may be required for processing a database request, (ii) at least one database function provided by a first one of the database systems 104A and 104B in a different manner and/or different version than that provided by a second one of the multiple database systems 104A and 104B, such that it may be preferred or more suitable for processing a particular database request, (iii) an interface provided for accessing only one of the database systems 104A and 104B, for example, in consideration of processing of the database requests that require data stored in one of the database systems 104A and 104B that does not support the interface, or (iv) in consideration of processing database requests that can be processed using the data in the manner represented and/or stored in one of the database systems 104A and 104B, and so on.

Referring again to FIG. 1, data about the database systems 104A and 104B can be stored as data 110. Data 110 can, for example, be provided as catalog data or dictionary data and it can be effectively indicative of the differences between the database systems 104A and 104B. As such, the database unifying system 102 can be configured to access the data 110 in order to make decisions about the execution of database requests in a manner that would take into account the database systems 104A and 104B as a whole, effectively as a unified database system, but in light of one or more differences between them.

By way of example, the database unifying system 102 can be operable to determine that none of the database systems 104A and 104B can independently process a particular database request. As a result, the database unifying system 102 can use one or more links (L) between the database systems 104A and 104B to effectively use both of them in order to process the database request. It should be noted that a link (L) can allow data stored in a first one of the database systems 104A and 104B to be accessed by a second one of them, thereby effectively allowing the database systems 104A and 104B to behave as a unified or a cohesive system under the direction or control of the database unifying system 102.

It should also be noted that the database unifying system 102 can also be configured to generate or to create the one or more links (L) between the database systems 104A and 104B. It will also be appreciated that the database unifying system 102 can be configured to generate the one or more links (L) in a dynamic manner and as they would be needed, typically, as needed for the execution of a database query. A generated link (L) can optionally be stored for later use. Generally, one or more links (L) can be generated and/or maintained by the database unifying system 102 and/or another entity which, for example, may be configured to generate and/or maintain the one or more links (L).

As noted above, the database unifying system 102 can effectively process a database request using the resources of database systems 104A and 104B in a cohesive manner despite the differences between them. In doing so, the unifying system 102 can effectively process a database request based on the information about the database systems 104A and 104B. This information can, for example, be stored as data 110 (shown in FIG. 1). In other words, the unifying system 102 can effectively process a database request by considering the differences between the database systems 104A and 104B.

By way of example, the unifying system 102 can be configured to determine that none of the multiple database systems 104A and 104B can independently process a database request, and consequently, use one or more links (L) between the database systems 104A and 104B. It should be the link(s) L can at least allow data stored in a first one of the database systems 104A and 104B to be accessed by a second one of the systems 104A and 104B. The database request can, for example, be associated with a client or system with no direct access and/or interface to one of the database system 104A and 104B that stores the data needed to process the database request. The unifying system 102 can be also be configured to generate the one or more links (L) between the database systems 104A and 104B, possibly, in a dynamic manner.

A link (L) can, for example, allow one or more functions in a first one of the multiple database systems 104A and 104B to access data stored in a second one the database systems 104A and 104B. A link (L) can also allow result data, obtained by executing one or more functions of a first one of the database systems 104A and 104B, to be provided to a second one of the database systems 104A and 104B.

As another example, the unifying system 102 can also be configured to determine whether processing of a database request requires a distinct function that exists in only one of the database systems 104A and 104B, and accordingly execute or effectively cause the execution of the distinct function that exists in only one of the database systems 104A and 104B in the appropriate database system when it is determined that the processing of the database request requires a distinct function that exists in only one of the database systems 104A and 104B. Similarly, the unifying system 102 can also be configured to determine that at least a portion of data needed to process a database request exists only in one of the database systems 104A and 104B and effectively allow the data to be provided to other database system when there is a need to do so (e.g., when data needed for processing a database request exists only in the database system 104A but the database system 104B is processing the database request).

Generally, the database unifying system 102 can be configured to determine whether processing of a database request, by one of the database systems 104A and 104B, requires data (e.g., a data set, result data) available in or from another one of the database systems 104A and 104B, and effectively provide the data to the other one of the database systems 104A and 104B.

It will be appreciated that that the database unifying system 102 can also be configured to make various other decisions associated with executing a database request. As another example, the database unifying system 102 can be configured to determine whether only one of the database systems 104A and 104B is to execute a database request based on either necessity or choice (e.g., based on current workload, assigned priority). As yet another example, the unifying system 102 can be configured to select a first version of a function provided by a first one of the database systems 104A and 104B over a second version of the function provided by a second one of the 104A and 104B when, for example, the first of the function is deemed more appropriate for processing the database request. Similarly, the database unifying system 102 can be configured to select a first version of data (or data set) stored in a first one of the database systems 104A and 104B over a second version of data stored in another one of the database systems 104A and 104B, when, for example, the first version of data is deemed more appropriate then the second version of data for processing the database request.

Referring to FIG. 1, it should be noted that a database query 107 can be processed by the interface 106 (e.g., a SQL interface) via the database unifying system 102 to access a database 104B even though it may not be possible to directly access the database 104B via the interface 106. In other words, the database unifying system 102 can provide access to both database systems 104A and 104B via the same interface 106 even though one of the database systems 104A and 104B may not support interface 106 as a direct mechanism for accessing it.

It should be noted that the database unifying system 102 can also be configured to effectively use both of the database systems 104A and 104B for processing a database request, for example, in a distributed and/or balanced manner. A database request or database load can be distributed and/or balanced, for example, in accordance with the techniques described in the U.S. Pat. No. 8,209,699, entitled "SYSTEM AND METHOD FOR SUBUNIT OPERATIONS IN A DATABASE," and U.S. Pat. No. 8,209,696, entitled: "METHOD AND SYSTEM FOR LOAD BALANCING A DISTRIBUTED DATABASE," which are both hereby incorporated by references herein in their entirety and for all purposes.

Figure 2:
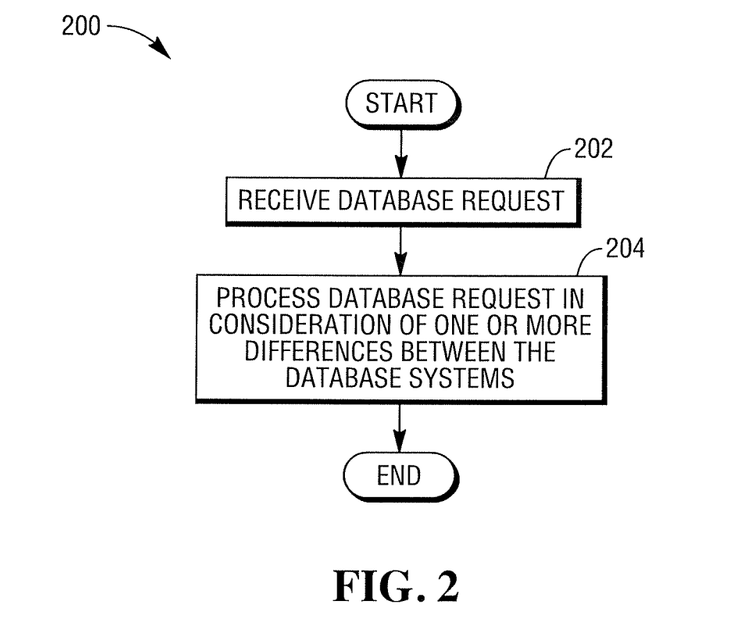
FIG. 2 depicts a method for processing a database request, in a database environment that includes multiple database systems, in accordance with one embodiment of the invention.

To further elaborate, FIG. 2 depicts a method 200 for processing a database request, in a database environment that includes multiple database systems, in accordance with one embodiment of the invention. It should be noted that the database systems can differ at least with respect to one of: one or more database capabilities provided by at least one of the database systems, representation of data in at least one the database systems, and one or more interfaces provided for accessing at least one of the database systems. Method 200 can, for example, be used by the database unifying system 102 (shown in FIG. 1). Referring to FIG. 2, a database request is received (202). Typically, the database request is associated with data of one or more of the database systems. Next, the database request is processed (204) by at least one of the database systems in consideration of one or more differences between the multiple database systems. The differences can, for example, include at least one of: differences between the one or more database capabilities provided by the multiple database systems, differences between the representation of data in the multiple database systems, and differences in the interfaces for accessing the multiple database systems. Method 200 ends after the database request has been processed (204) based on at least one difference between the two database systems.

Figure 3:
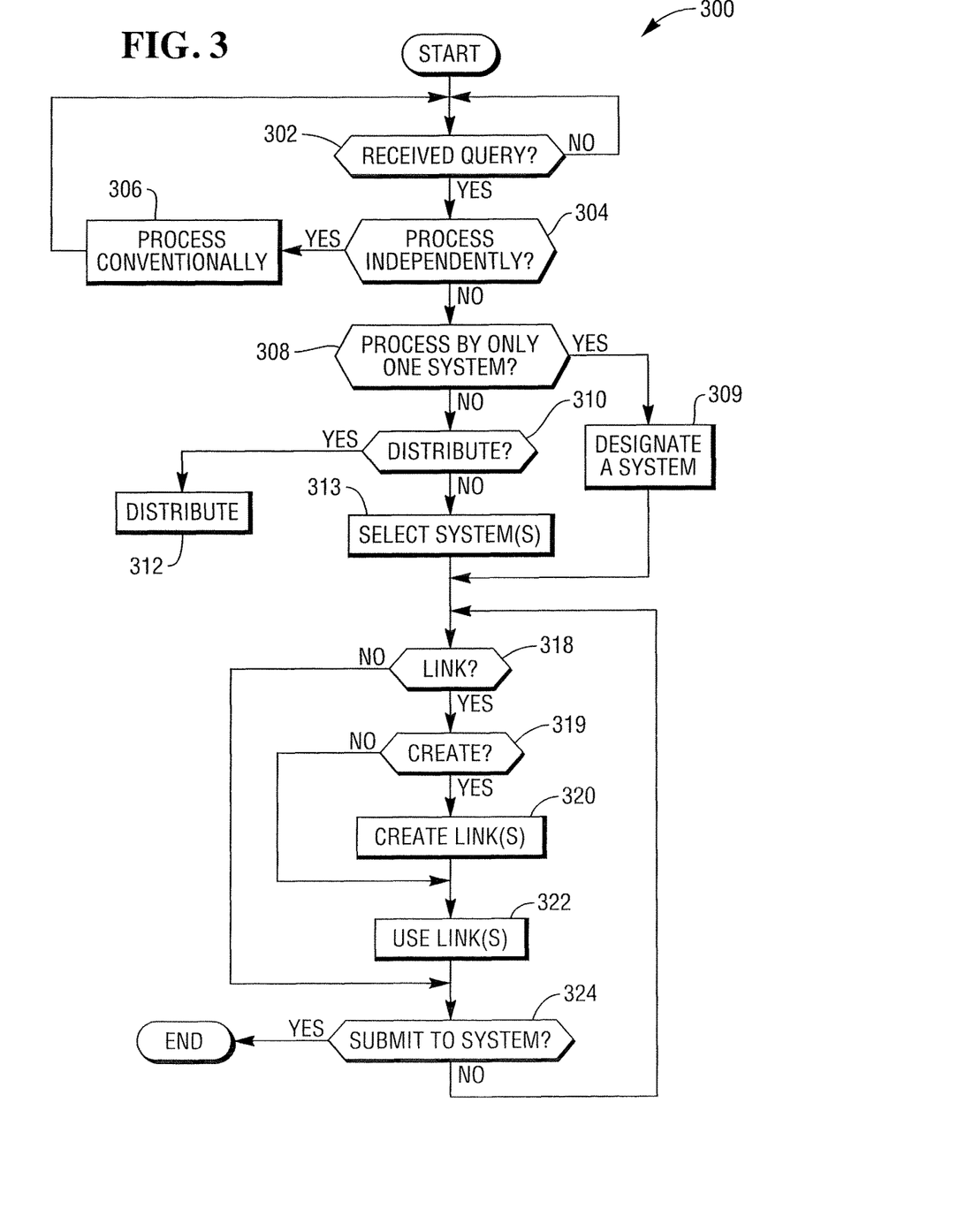
FIG. 3 depicts a method for processing a database request, in a database environment that includes multiple database systems, in accordance with one embodiment of the invention.

To elaborate even further, FIG. 3 depicts a method 300 for processing a database request, in a database environment that includes multiple database systems, in accordance with one embodiment of the invention. The multiple database systems can differ at least with respect to one of: one or more database capabilities provided by at least one the multiple database systems, representation of data in at least one the multiple database systems, one or more interfaces provided for accessing at least one of the multiple database systems. Method 300 can, for example, be used by the database unifying system 102 (shown in FIG. 1).

Referring to FIG. 3, it can be determined (302) whether a database request has been received. Typically, the database request is associated with data of one or more of multiple database systems. Next, it is determined (304) whether to process the database request independently in one of the database systems. For example, it can be determined (304) whether it is possible or desirable to process the database request independently by only one of the multiple database systems. If it is determined (304) to process the database request independently in one of the database systems, the database request can be processed (306) independently in one of the database systems in a conventional manner. Thereafter, the method 300 can proceed to determine (302) whether a database request is received.

However, if is determined (304) not to process the database request independently in one of the database systems, it can be determined (308) whether to use only one database systems to process the database request. By way of example, it can be determined (308) whether the database request can be executed only in one database system that is configured to process a particular type of a database request (e.g., SQL database query). Accordingly, a database system can be designated (309) for execution of the database request.

Otherwise, it can be determined (310) whether to effectively distribute the processing of the database request between the database systems, and the processing of the database request can be effectively distributed (312) between the database systems. If it is determined (310) not to distribute the database request, one or more database systems that are preferred for processing of the database request can be selected (313).

Consequently, a designated (309) database system or at least one selected (313) database system can be determined. By way of example, a selection can be made based on one or more of the following: one or more of the following: access rights, security, cost of execution, cost of transfer, representation of data, database indexes, database system utilization. Thereafter, it can be determined (318) whether there is need to use one or more links between the two or more database systems. A link can, for example, be provided as a view or external view from one database system to another database system. Next, it can be determined (319) whether to create a link to process the database request. Consequently, one or more links can be created (320) if it is determined (319) that there is a need to create one or more links. Thereafter, one or more created links and/or existing links can be used (322) accordingly. After a link is used, the method 300 can continue in the same manner to create additional links and to use them as needed before submitting (322) at least a portion of the database request to at least one designated system for processing. The method 300 can end after submitting (322) of the at least a portion of the database request to at least one designated system for processing.

Of course, a database request can be comprised of multiple parts that can be processed in a similar manner as discussed above even though for simplicity reference was made with respect to a database request. Similarly, multiple or one or more group or groups of database requests can be processed in a similar manner as discussed above with respect to FIG. 3. Also, in processing a part of a database request various decisions can be made with respect to processing by one or more systems in a similar manner as discussed above with respect to FIG. 3.

Figure 4:
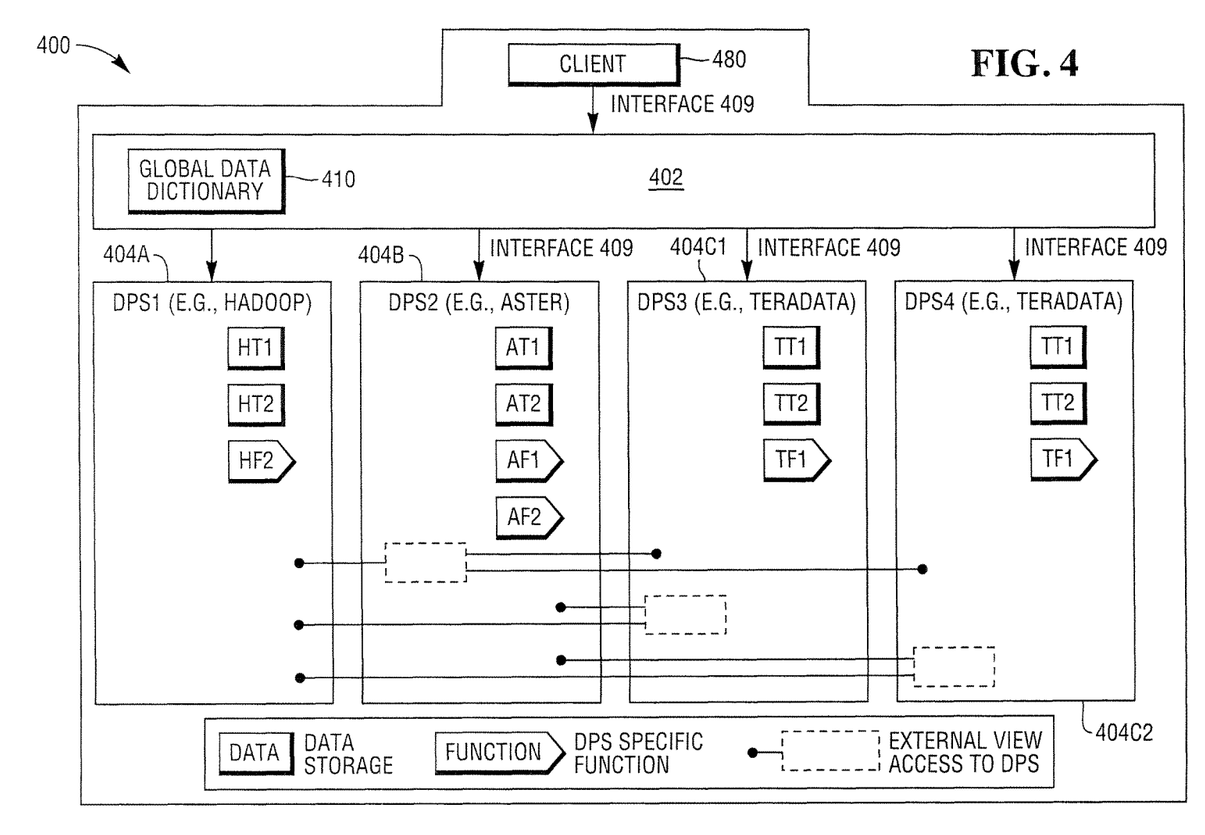
FIG. 4 depicts a computing environment with a database unifying system capable of supporting multiple database systems in accordance with one embodiment of the invention.

To elaborate still further, FIG. 4 depicts a computing environment 400 with a database unifying system 402 capable of supporting multiple database systems 404A (e.g., a Hadoop-based database system), 404B (e.g., an Aster-based database system), 404C1 (e.g., Teradata-based database system) and 404C2 (e.g., a Teradata-based database system) in accordance with one embodiment of the invention. FIG. 4 can represent in greater detail an exemplary computing environment 400 where each one of the database systems can be a Data Processing System (DPS) as generally known in the art. Moreover, it will be appreciated that DPS 404A, DPS 404B and DPS 404C (collectively representing DPS 404C1 and DPS 404C2) can have distinct capabilities from each other, for example, in terms of their data storage and processing functionality. Database requests can, for example, come from a client 408 (e.g., an application program) that can be configured to submit the database requests via a specific interface (e.g., SQL) that may be supported, for example, by the DPS 404C and 404B, but not by DPS 404A.

As suggested by FIG. 4, client 480 can, for example, be configured to directly interface and/or directly access the unifying system 402 in order to make a database request (e.g., submit a SQL request). In response to the database request, the database unifying system 402 can parse the database request and determine which one of the DPS 404A, 404B and 404C is to process the database request. By way of example, the database unifying system 402 can determine that DSP 404B and DSP 404C can process the request given that the request is submitted through a specific interface (e.g., SQL) supported by them but not supported by DSP 404A. The parsing of the database request by the unifying database system 402 can, for example, generate and/or determine data and functional objects that are required to process the request.

The unifying system 402 can effectively implement and/or enforce processing rules with respect to one or more of the DPS' 404 (shown in FIG. 4). For example, the processing rules can be one or more of the following:

If only a single DPS can respond to a particular database request, submit the database request to the DPS.

If a request can be answered by more than one DPS, use a workload balancing strategy to distribute requests among systems.

If there is no system that can process the request independently, then dynamically create of one or more external views to access the required data from one of the systems.

The decision for which system to use for processing can, for example, use one or more of the following rules:

Only a DPS that has a specific interface (e.g., SQL) needed for processing a database request can be used as the main processor of the database request.

If the database request uses one or more Functions that only exist on one DPS, that DPS will be designated as the processing system.

If there are still multiple DPS' available to process the database request, evaluate the cost, for example, based on the cost of data transfer, the size of the data, and select the DPS that requires the least amount of data transfer.

Once the DPS is selected, create one or more external views needed for processing the request on that DPS, such that they can represent a local version of the data. Note that a DPS that does not have a needed interface for processing can still be accessed through the external views, but the DPS need not be used as the main processor for processing the database request.

A database request can be rewritten replacing data objects from other DPS' with the corresponding external views and the database request can be submitted to a selected DPS.

External views created by prior requests can persist in order to avoid the cost of recreation on subsequent request.

Generally, responses from a database request can be received by the database unifying system 402 and forwarded on to the client 408. Referring to FIG. 4, unifying system 402 can effectively include and use a data storage 410 that can, for example, be provided as a Data Dictionary that effectively allows the unifying system 402 to understand which objects are available on each of the DPS' 404. It should be noted that the Data Dictionary can be provided as a global dictionary extended across various types of DPS' to effectively allow the unifying system 402 to understand various data models and functions available in all the DPS' 404. With this understanding in place, database unifying system 402 can direct or load balance requests (e.g., database queries) to one or more of the DPS' 404 capable of responding to the database request. This concept can be extended to support various DPS' including, for example, Aster Data and Hadoop based systems. Furthermore, this can, for example, be provided as an extension to existing unifying systems (e.g., Teradata's Unity) that generally support only systems of the same type, allowing, for example, an instance of Teradata's Unity to front a number of other systems (e.g., Aster Data systems and/or Hadoop systems) in addition to multiple Teradata systems. By extending the Data Dictionary to understand the various data models and functions available in all the DPS' (e.g., a Global Dictionary) requests can be directed to any system within the environment that can provide the required response.

As also suggested by FIG. 4, data storages of the DPS' 404 can represent data in a different form. Also, distinct functions or DPS specific functions can exist, where a link between the DPS' can be effectively provided with or as an external view that allows access to a DPS and the data it stores.

Generally, various aspects, features, embodiments or implementations of the invention described above can be used alone or in various combinations. Furthermore, implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter affecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CDROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, tactile or near-tactile input.

Implementations of the subject matter described in this specification can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described is this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The various aspects, features, embodiments or implementations of the invention described above can be used alone or in various combinations. The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method, implemented at least partly by a device, for processing one or more database requests in a database environment that includes multiple database systems that differ with respect to at least one of: one or more database capabilities, one or more representations of data, and one or more interfaces provided for accessing the database systems, the method comprising:

receiving at least one database request associated with data of one or more of the multiple database systems; and processing the at least one database request by at least one of the database systems in consideration of at least one of the differences between the multiple database systems by performing at least the following:

determining whether the at least one database request can be independently processed by at least one the database systems; and creating a link between two or more of the database systems in order to process the least one database request when the determining determines that none of the database systems can independently process the at least one database request.

2. The method of claim 1, wherein the differences between the one or more database capabilities include at least one database function provided by a first one of the multiple database systems but not provided by a second one of the multiple database systems.

3. The method of claim 1, wherein the differences between the one or more database capabilities include at least one database function provided by a first one of the multiple database systems in a different manner and/or different version than it is provided by a second one of the multiple database systems.

4. The method of claim 1, wherein the at least one database query requires data stored in one of the multiple database systems that cannot directly process the database request.

5. The method of claim 1, wherein the processing of the at least one database request comprises using stored data that includes the least one of the differences between the multiple database systems.

6. The method of claim 1, wherein the processing of the database request further comprises: determining that none of the multiple database systems can independently process the database request; and using one or more links between the multiple database systems.

7. The method of claim 6, wherein the links at least allow data stored in a first one of the multiple database systems to be accessed by a second one of the multiple database systems.

8. The method of claim 1, wherein the database request is associated with a client or system with no direct access or interface for accessing data needed to process the database request.

9. The method of claim 1, wherein the method further comprises: generating links that effectively allow functions in a first one the multiple database systems to access data stored in a second one the multiple database.

10. The method of claim 1, wherein the method further comprises: generating links that effectively allow result data obtained by executing one or more functions of a first one of the multiple database systems to be provided to a second one of the multiple database systems.

11. The method of claim 1, wherein the method further comprises: dynamically creating one or more links between the multiple database systems as needed for processing the database request.

12. The method of claim 11, wherein the method further comprises: storing at least one of the links for processing one or more other databases requests.

13. The method of claim 1, wherein the method further comprises: determining that the processing of the database request requires a distinct function that exists in only a first one of the database systems; and thereafter, executing the distinct function in the first database system.

14. The method of claim 1, wherein the method further comprises: determining that the processing of the database request by a first one of the database systems requires data in a second one of the database systems; and thereafter, effectively providing the data to the second database system.

15. The method of claim 1, wherein the method further comprises: selecting a first version of a function provided by a first one of the multiple database systems over a second version of the function provided by a second one of the multiple database systems for the processing of the database request.

16. The method of claim 1, wherein the method further comprises: selecting a first version of a data stored in a first one of the multiple database systems over a second version of the data provided by a second one of the multiple database systems for the processing of the database request.

17. The method of claim 1, wherein the processing of the database request further comprises: using a data dictionary that stores information associated with capabilities of each one of the multiple database systems and how the capabilities relate to each other.

18. The method of claim 1, wherein the processing of the database request further comprises: determining which one of the database systems is to process the base request based on one or more of the following: access rights, security, cost of execution, cost of transfer, representation of data, database indexes, database system utilization.

19. The method of claim 1, wherein the processing of the database request further comprises: using an external view of first data of one of the multiple database systems to effectively provide the first data to another one of the multiple database systems.

20. A device that includes one or more processor configured to:
  process one or more database requests in a database environment that includes multiple database systems that differ with respect to at least one of: one or more database capabilities, one or more representations of data, and one or more interfaces provided for accessing the database systems; receive at least one database request associated with data of one or more of the multiple database systems;
  process the at least database request by at least one of the database systems in consideration of at least one of the differences between the multiple database systems; and
  determine whether the at least one database request can be independently processed by at least one the database systems; and
  create a link between two or more of the database systems in order to process the least one database request when the determining determines that none of the database systems can independently process the at least one database request.

21. A non-transitory computer readable storage medium storing at least executable code for processing one or more database requests in a database environment that includes multiple database systems that differ with respect to at least one of: one or more database capabilities, one or more representations of data, and one or more interfaces provided for accessing the database systems, wherein the executable code when executed:
  receives at least one database request associated with data of one or more of the multiple database systems;
  processes the at least one database request by at least one of the database systems in consideration of at least one of the differences between the multiple database systems; and
  determine whether the at least one database request can be independently processed by at least one the database systems; and
  create a link between two or more of the database systems in order to process the least one database request when the determining determines that none of the database systems can independently process the at least one database request.

* * * * *